US012797298B2

(12) United States Patent
Sugimoto et al.

(10) Patent No.: US 12,797,298 B2
(45) Date of Patent: Nov. 17, 2026

(54) MANUAL MEDICINE DISTRIBUTING APPARATUS

(71) Applicant: Takazono Corporation, Kadoma (JP)

(72) Inventors: Naoya Sugimoto, Kadoma (JP); Shunsuke Umezawa, Kadoma (JP)

(73) Assignee: Takazono Corporation, Kadoma (JP)

( * ) Notice: Subject to any disclaimer, the term of this patent is extended or adjusted under 35 U.S.C. 154(b) by 215 days.

(21) Appl. No.: 18/719,326

(22) PCT Filed: Nov. 16, 2022

(86) PCT No.: PCT/JP2022/042467

§ 371 (c)(1),
(2) Date: Jun. 13, 2024

(87) PCT Pub. No.: WO2023/119959

PCT Pub. Date: Jun. 29, 2023

(65) Prior Publication Data

US 2025/0127686 A1 Apr. 24, 2025

(30) Foreign Application Priority Data

Dec. 24, 2021 (JP) ................................ 2021-211239

(51) Int. Cl.
*A61J 7/00* (2006.01)

(52) U.S. Cl.
CPC .................................. *A61J 7/0076* (2013.01)

(58) Field of Classification Search
CPC ... B65B 1/04; B65B 1/30; B65B 5/068; A61J 7/0069
See application file for complete search history.

(56) References Cited

U.S. PATENT DOCUMENTS

| | | | | |
|---|---|---|---|---|
| 7,587,878 B2 * | 9/2009 | Kim | A61J 7/0069 53/51 |
| 7,922,037 B2 * | 4/2011 | Ohmura | G06V 20/66 221/3 |
| 10,593,145 B2 * | 3/2020 | Patel | G16H 20/13 |
| 11,896,557 B2 * | 2/2024 | van Beek | G16H 20/13 |
| 2009/0188937 A1 | 7/2009 | Kim | |
| 2013/0026174 A1 | 1/2013 | Yuyama et al. | |
| 2023/0192333 A1 | 6/2023 | Koike | |

(Continued)

FOREIGN PATENT DOCUMENTS

| | | |
|---|---|---|
| CN | 101237845 A | 8/2008 |
| JP | 2007297066 A | 11/2007 |

(Continued)

*Primary Examiner* — Michael Mccullough
(74) *Attorney, Agent, or Firm* — The Webb Law Firm

(57) ABSTRACT

A manual medicine distributing apparatus includes a receiving body including a plurality of receiving parts each having a receiving area in which medicine can be placed, each of the plurality of receiving parts being open upward and configured to allow an operator to manually place the medicine thereinto from above. The manual medicine distributing apparatus includes at least one position indicator configured to indicate a receiving part of the plurality of receiving parts into which the medicine should be placed, in which the at least one position indicator includes a light projector configured to project light to an inner wall surface of the receiving part.

4 Claims, 6 Drawing Sheets

(56) References Cited

U.S. PATENT DOCUMENTS

| | | | | |
|---|---|---|---|---|
| 2025/0064679 | A1* | 2/2025 | Umezawa ................. | A61J 3/00 |
| 2026/0027012 | A1* | 1/2026 | Sugimoto ................. | A61J 3/00 |

FOREIGN PATENT DOCUMENTS

| | | | |
|---|---|---|---|
| JP | 2019037373 | A | 3/2019 |
| KR | 20160051305 | A | 5/2016 |
| WO | 2011125650 | A1 | 10/2011 |
| WO | 2020021921 | A1 | 1/2020 |
| WO | 2021210516 | A1 | 10/2021 |

* cited by examiner

MANUAL MEDICINE DISTRIBUTING APPARATUS

CROSS-REFERENCE TO RELATED APPLICATIONS

This application is the United States national phase of International Patent Application No. PCT/JP2022/042467 filed Nov. 16, 2022, and claims priority to Japanese Patent Application No. 2021-211239 filed Dec. 24, 2021, the disclosures of which are hereby incorporated by reference in their entireties.

BACKGROUND OF THE INVENTION

Field of the Invention

The present invention relates to a manual medicine distributing apparatus for manually distributing medicine.

Description of Related Art

Conventionally known as an apparatus including a manual medicine distributing apparatus is a manual medicine supply device described in Patent Literature 1. The manual medicine supply device includes: a manual medicine supply part partitioned into a grid shape to have a plurality of medicine receiving parts into which an operator manually places (manually distributes) medicine; and a position indicator formed of an LED disposed close to each corresponding one of the plurality of medicine receiving parts.

According to such a manual medicine supply device, an operator can place medicine into those medicine receiving parts whose position indicators have their LEDs emitted for manual distribution, and can thus efficiently place the medicine into the medicine receiving parts.

CITATION LIST

Patent Literature

Patent Literature 1: WO 2011/125650 A

SUMMARY OF THE INVENTION

Technical Problem

The manual medicine distributing apparatus described in Patent Literature 1 has the position indicators disposed close to the respective medicine receiving parts, which raises a problem that the operator fails to intuitively recognize the medicine receiving part corresponding to the position indicator with its LED emitted, and finds it difficult to identify where to place the medicine.

It is therefore an object of the present invention to provide a manual medicine distributing apparatus capable of easily identifying a position at which medicine should be placed.

Solution to Problem

A manual medicine distributing apparatus of the present invention includes a receiving body including a plurality of receiving parts each having a receiving area in which medicine can be placed, each of the plurality of receiving parts being open upward and configured to allow an operator to manually place the medicine thereinto from above, the manual medicine distributing apparatus including at least one position indicator configured to indicate a receiving part of the plurality of receiving parts into which the medicine should be placed, in which the at least one position indicator includes a light projector configured to project light to an inner wall surface of the receiving part.

DESCRIPTION OF THE INVENTION

Figure 1:
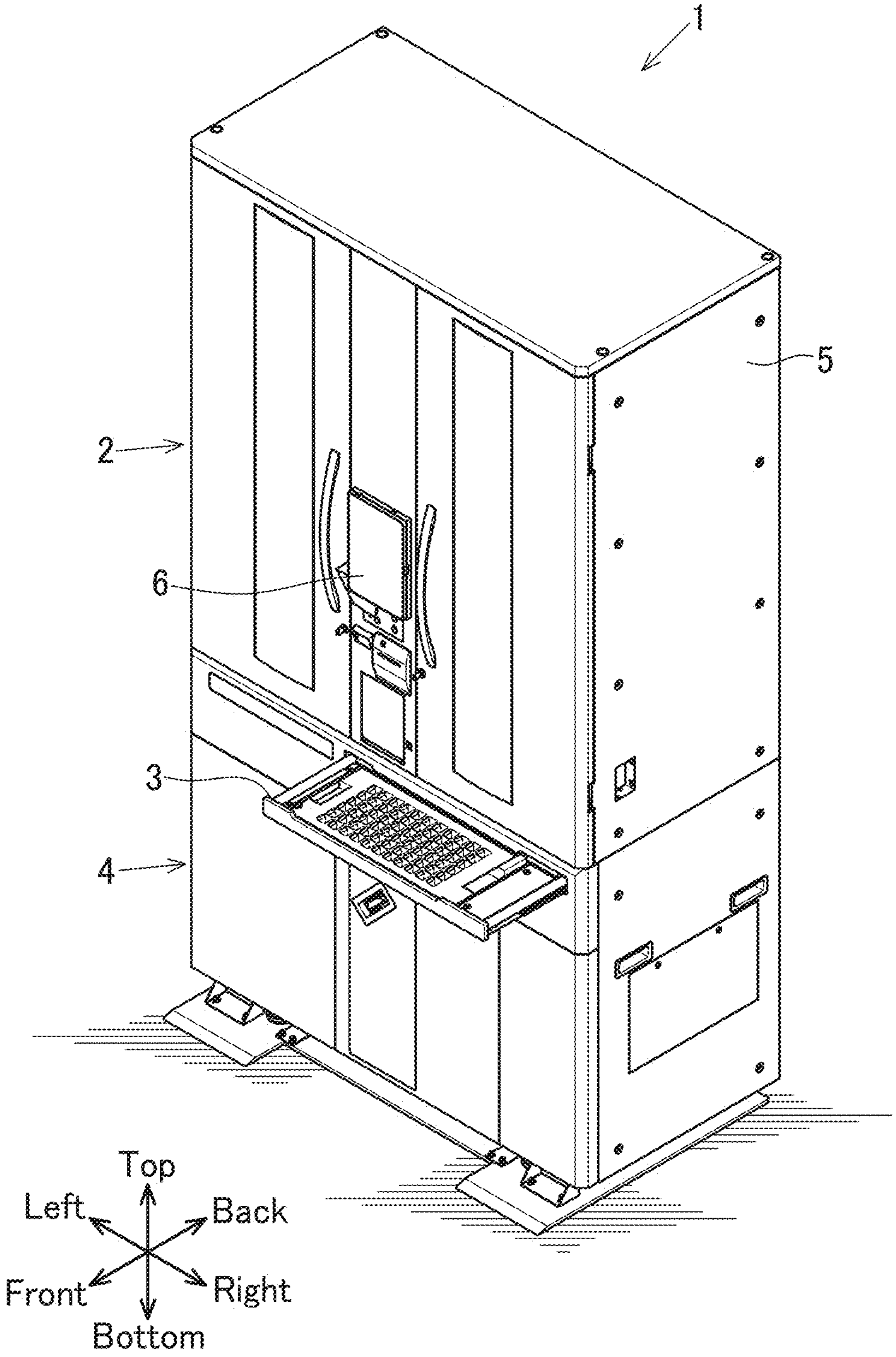
FIG. 1 is a perspective view of a medicine packaging apparatus including a manual medicine distributing apparatus according to one embodiment of the present invention.

A manual medicine distributing apparatus 3 according to one embodiment of the present invention will be described with reference to FIG. 1 to FIG. 6. A description on vertical, right-left, and depth directions will be given based on the directions of the apparatus when installed. Specifically, the depth direction refers to a direction orthogonal to a front surface of a housing 5, and a description will be given with a front side being a near side and a back side being a far side.

The manual medicine distributing apparatus 3 of this embodiment is configured as a part of a medicine packaging apparatus 1 for packaging medicine. First, a description will be given on the medicine packaging apparatus 1 with reference to FIG. 1.

The medicine packaging apparatus 1 is an apparatus configured to package medicine per dose in a package such as packaging paper. Specifically, the medicine packaging apparatus 1 includes: an automatic feeding apparatus 2 including a plurality of cassettes (not shown) in which the medicine is stored, and capable of feeding the medicine stored in the cassettes; the manual medicine distributing apparatus 3 configured to feed the manually distributed medicine; a packaging part 4 configured to package the medicine fed from the automatic feeding apparatus 2 and the manual medicine distributing apparatus 3 in the package; and a box-shaped housing 5 for housing the automatic feeding apparatus 2, the manual medicine distributing apparatus 3, and the packaging part 4 therein. The medicine packaging apparatus 1 further includes an input part 6 capable of inputting prescription information relating to information on the medicine to be packaged, and a controller part for controlling the entire medicine packaging apparatus 1. In this embodiment, both the medicine stored in the cassettes and the medicine placed into the manual medicine distributing apparatus 3 are tablets or capsules.

The automatic feeding apparatus 2 has a plurality of types of medicine stored therein. Specifically, in the automatic feeding apparatus 2, the plurality of types of medicine are stored in the separate cassettes. Further, the automatic feeding apparatus 2 is configured to feed the stored medicine to the packaging part 4 in response to an instruction from the controller part. The automatic feeding apparatus 2 can also include a plurality of cassettes storing a single type of medicine to be fed in a large amount.

The packaging part 4 is a portion for packaging doses of the medicine fed from the automatic feeding apparatus 2 and the manual medicine distributing apparatus 3 in the separate packages. The packaging part 4 is a portion disposed below the automatic feeding apparatus 2 and the manual medicine distributing apparatus 3. In this embodiment, the medicine fed from the automatic feeding apparatus 2 and the manual medicine distributing apparatus 3 moves by gravity through a medicine feeding passage (not shown) within the housing 5, and is fed to the packaging part 4.

The manual medicine distributing apparatus 3 is configured to allow the medicine to be placed thereinto by manual distribution, and configured to feed the placed medicine to the packaging part 4. The device to which the manual medicine distributing apparatus 3 of this embodiment feeds the medicine is the packaging part 4 of the medicine packaging apparatus 1. Specifically, the manual medicine distributing apparatus 3 includes: a receiving body 11 including a plurality of receiving parts 12 each having a receiving area in which the manually distributed medicine can be received; a plurality of position indicators 13 each configured to indicate each corresponding one of the receiving parts 12 into which the medicine should be placed; a destaticizer 14 configured to eliminate static electricity from the medicine in the receiving body 11 before being fed to the packaging part 4; and the housing 5 for housing the receiving body 11, the position indicators 13, and the packaging part 4 therein. The housing 5 of this embodiment is formed as the housing 5 of the medicine packaging apparatus 1. The housing 5 has a housing space S1 thereinside, in which the receiving body 11 can be housed (see FIG. 6). The manual medicine distributing apparatus 3 further includes the input part 6 capable of inputting prescription information relating to information on the medicine to be manually distributed; and the controller part configured to control the entire manual medicine distributing apparatus 3. The input part 6 and the controller part of this embodiment are configured integrally with the input part 6 and the controller part of the medicine packaging apparatus 1.

The receiving body 11 includes the plurality of receiving parts 12 each defining the receiving area as a recess in which the medicine can be received, and has a plate shape having a smaller thickness (vertical dimension) than a transverse dimension and a depth dimension. Further, the receiving body 11 includes the plurality of receiving parts 12 arranged in a horizontal direction. In the receiving body 11 of this embodiment, a plurality of rows of the receiving parts 12 are disposed, each row including the receiving parts 12 arranged in the depth direction. Further, in the receiving body 11 of this embodiment, each of the plurality of rows of the receiving parts 12 includes six receiving parts 12 arranged in the depth direction. The receiving body 11 is a plate-like body disposed to have its thickness direction coinciding with the vertical direction. The receiving body 11 of this embodiment is a plate-like body disposed to have its long side direction and its short side direction coinciding respectively with the right-left direction and the depth direction.

Figure 6:
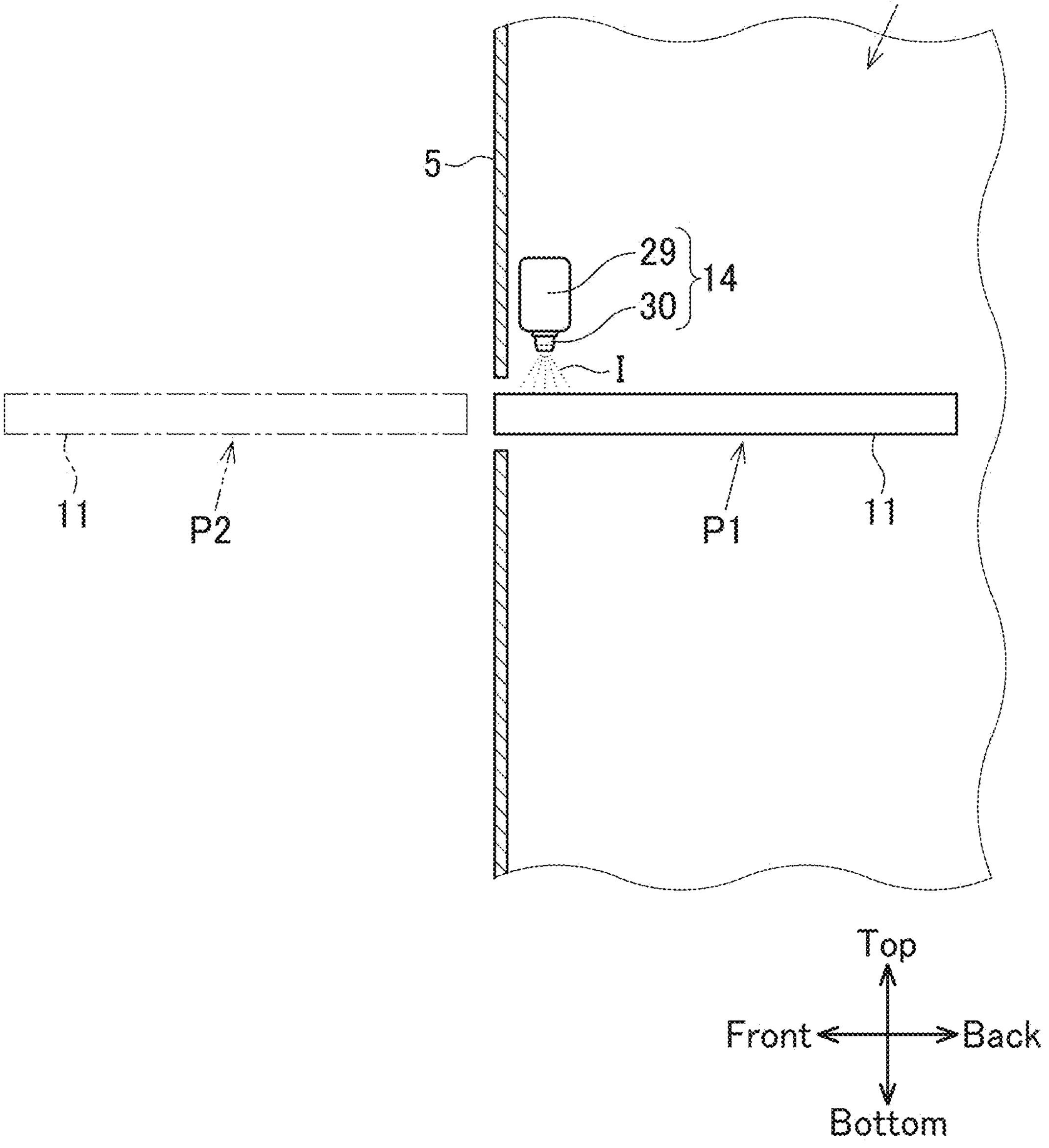
FIG. 6 is a view showing a destaticizer of the manual medicine distributing apparatus.

The receiving body 11 of this embodiment is configured to be movable between a housed position P1 at which the receiving body 11 is housed within the housing space S1 of the housing 5 and a projecting position P2 at which the receiving body 11 projects outside the housing 5 (see FIG. 6). Specifically, the receiving body 11 is configured to substantially horizontally slide forward from the housed position P1 to move to the projecting position P2. In this embodiment, the receiving body 11 is configured to automatically move between the housed position P1 and the projecting position P2, without limitation thereto, and the configuration can be such that the receiving body 11 manually moves therebetween.

Figure 2:
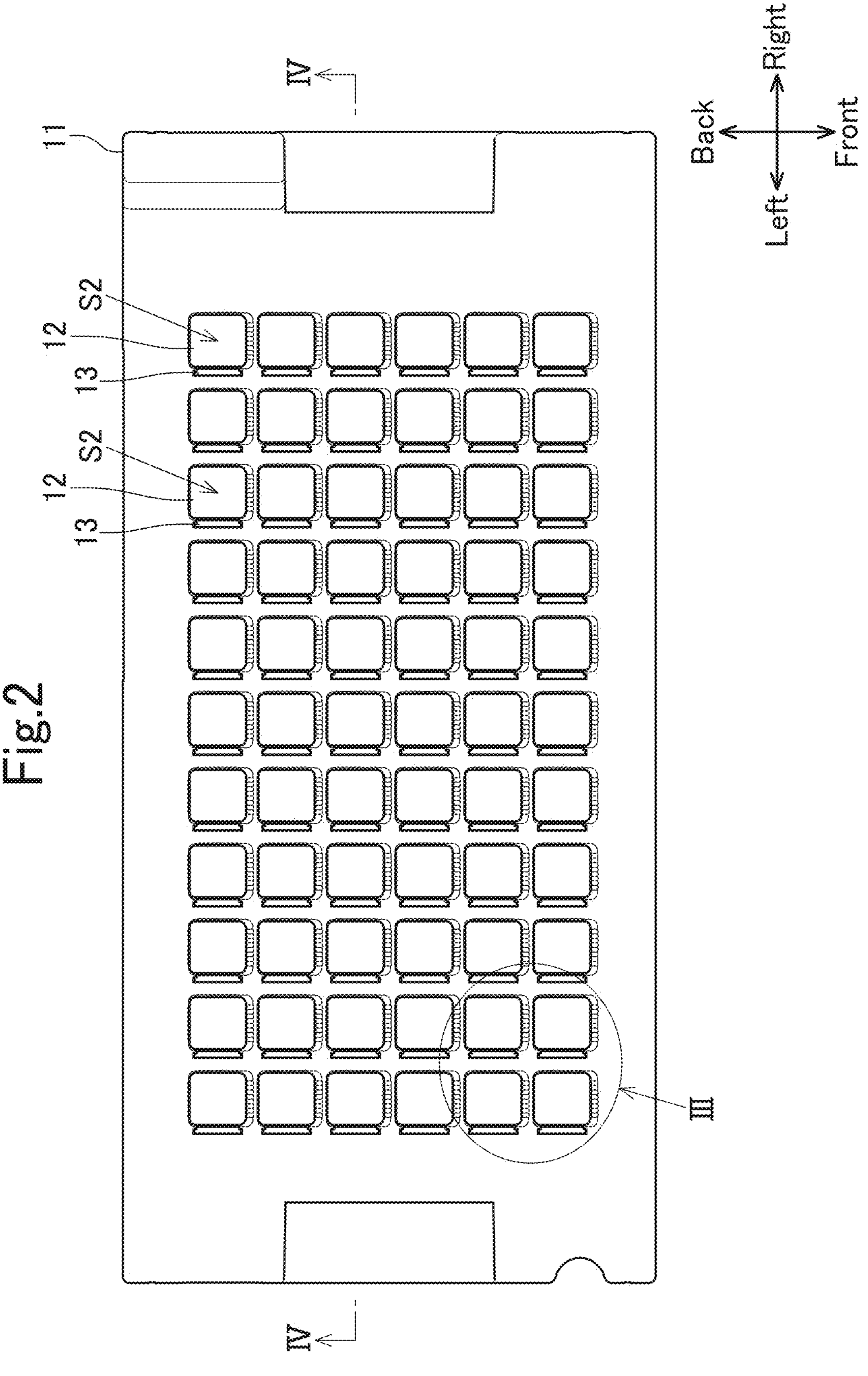
FIG. 2 is a plan view showing a receiving body of the manual medicine distributing apparatus.
Figure 3:
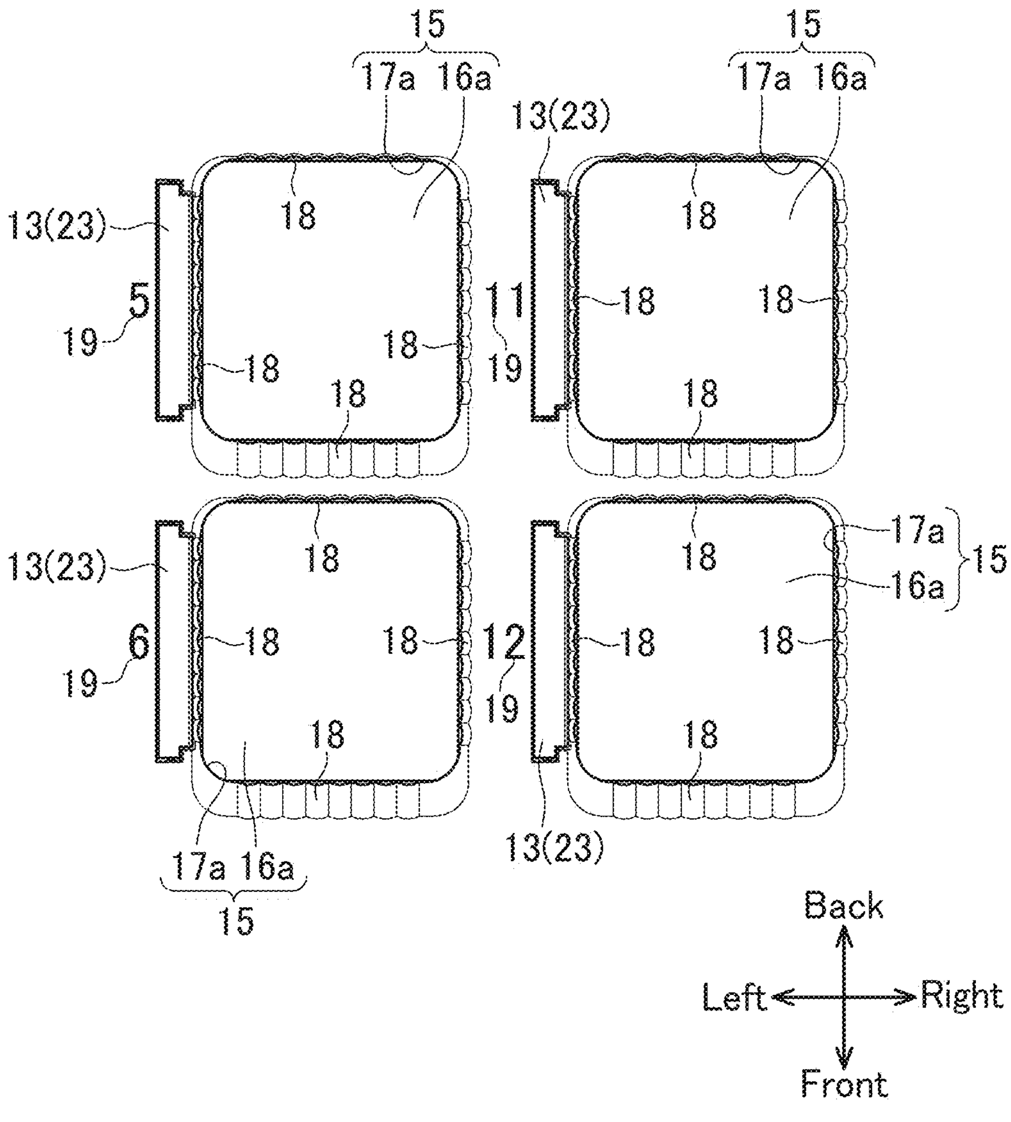
FIG. 3 is an enlarged view taken along III-III shown in FIG. 2.
Figure 4:
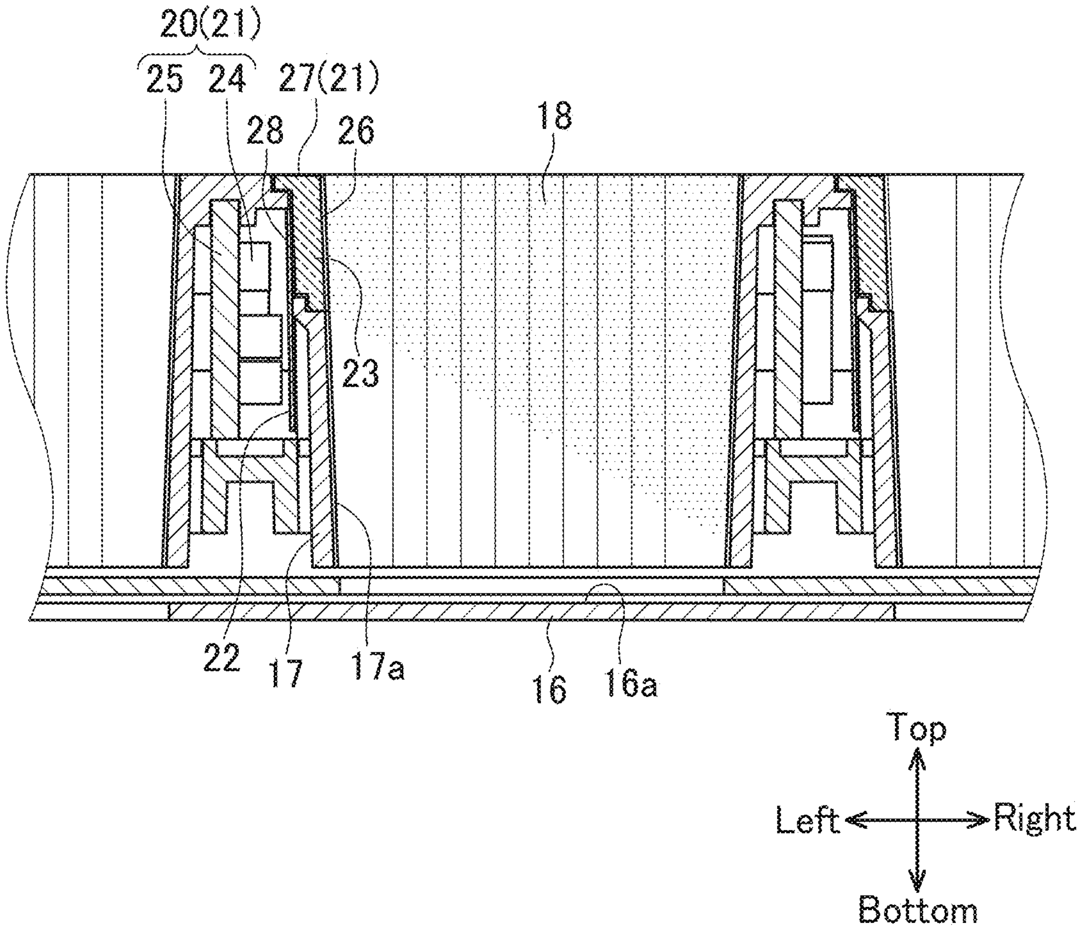
FIG. 4 is a cross-sectional view taken along IV-IV shown in FIG. 2.

As shown in FIGS. 2-4, each of the plurality of receiving parts 12 has an opening that opens upward, and is a box-shaped portion into which the operator can manually place the medicine from above. The receiving part 12 has an inner wall surface 15 defining a receiving area S2 in which the medicine can be received. Specifically, the receiving part 12 includes a bottom part 16 having a bottom surface 16*a* that forms a bottom (lower boundary) of the receiving area S2, and a side wall 17 having a side surface 17*a* that defines a side boundary of the receiving area S2. The side wall 17 is configured as a partition wall for separating the receiving areas S2 of each two receiving parts 12 disposed adjacent to each other.

The bottom part 16 is a bottom plate configured to be openable. Specifically, the bottom part 16 is in a closed state when the medicine is placed into the receiving area S2, and is in an open state when the medicine in the receiving area S2 is fed to the packaging part 4. That is, the bottom part 16 is configured to be switchable by being opened and closed between the state where the placed medicine is held within the receiving area S2 and the state where the placed medicine is fed to the packaging part 4. The bottom part 16 of this embodiment is opened in the housed state to allow the medicine within the receiving area S2 to fall freely to be fed to the packaging part 4 located below. Further, the bottom part 16 of this embodiment is composed of an electrically grounded conductor.

The side wall 17 is a wall body erecting upward from an outer edge portion of the bottom surface 16*a*. The side wall 17 has a tapered shape with a lower end side of the receiving area S2 being narrower and an upper end side thereof being wider. Further, the side wall 17 has an unevenness 18 on an inner surface. On the inner surface of the side wall 17 of this embodiment, a plurality of grooves extending along the vertical direction are formed as the unevenness 18. In the side wall 17 of this embodiment, the unevenness 18 (i.e., the plurality of grooves) extending along the vertical direction is formed at least on a back side surface. The unevenness 18 of this embodiment is formed on each of four inner surfaces of the side wall 17. The side wall 17 is a hollow wall body with a space for allowing the position indicator 13 to be housed therein. That is, the side wall 17 is configured to allow the position indicator 13 to be disposed between each adjacent receiving areas S2. Further, the unevenness 18 also serves as grooves for suppressing tablets from being tightly held to the side wall 17.

An upper end surface of the receiving part 12 surrounding the receiving area S2 is provided with an identification mark 19 for identifying the receiving part 12. The identification mark 19 is a mark located at a position adjacent to the receiving area S2. The identification mark 19 of this embodiment is a numerical figure shown on a left side of the receiving area S2 of each receiving part 12. Further, the numerical figure shown as the identification mark 19 represents the order in which the medicine placed in the corresponding receiving part 12 is packaged. That is, for example, the medicine placed in the receiving area S2 of the receiving part 12 with an identification mark 19 of "5" on the left side is packaged in the fifth package. The identification mark 19 of this embodiment is printed on the upper end surface of the receiving part 12. Further, the identification mark 19 is shown to be identifiable when viewed from the front side of the receiving body 11. That is, the numerical figure as the identification mark 19 of this embodiment is shown to have a lower portion directed to the front side and an upper portion directed to the back side. The identification mark 19 can be placed on the upper surface (i.e., second surface 27) of a light transmissive part 23, which will be described later.

As shown in FIG. 4, the position indicator 13 is disposed in the space inside the side wall 17. The position indicator 13 is a portion configured to be capable of projecting light to the inner wall surface 15 of the receiving part 12. The position indicator 13 of this embodiment includes a light projector 21 having a light source 20 and configured to project light to the inner wall surface 15 of the receiving part 12, and an insulating sheet part 22 for protecting the light source 20 from static electricity. The light source 20 of this embodiment is an LED. The position indicator 13 of this embodiment is disposed on the left side of the receiving part 12. Further, the position indicator 13 of this embodiment is disposed in an upper half area in the vertical direction of the receiving part 12.

The light projector 21 is a portion for illuminating the inner wall surface 15. Specifically, the light projector 21 includes the light source 20 that emits light to illuminate the inner wall surface 15, and a light transmissive part 23 that transmits the light emitted by the light source 20. The light source 20 of this embodiment includes a light emitter body 24 that emits light, and a base plate 25 having a circuit for allowing the light emitter body 24 to emit light. In this embodiment, the light projector 21 has one base plate 25 for each row of the receiving parts 12 arranged in the depth direction, and has a plurality of the light emitter bodies 24 arranged on the base plate 25 to be separated in the depth direction from each other.

The light source 20 is a portion that emits light toward the inner wall surface 15. Further, the light source 20 is disposed to emit light at least toward the back side surface of the inner wall surface 15. In this embodiment, the light source 20 is configured to emit light to three side surfaces of the inner wall surface 15 except the surface in which the light projector is located. The side surface of the inner wall surface 15 in which the light source 20 is located is indirectly illuminated by reflected light from the other side surfaces. Further, the light source 20 is located to emit light laterally from a lateral side toward the back side surface of the inner wall surface 15. In this embodiment, the light source 20 is configured to emit light from the left side of the back side surface of the inner wall surface 15. That is, the back side surface of the inner wall surface 15 is irradiated with light from the lateral side (i.e., left side). The back side surface of the inner wall surface 15 refers to a surface located farthest from the operator standing on the front side of the medicine packaging apparatus 1 when the operator manually distributes the medicine to the receiving parts 12. In this embodiment, the back side surface of the inner wall surface 15 refers to a surface of the inner wall surface 15 closest to the housing 5 when the receiving body 11 is at the projecting position P2. The light source 20 of this embodiment is configured to be capable of projecting colored light and white light to the inner wall surface 15 of the receiving part 12. Further, the light source 20 can project white light and the larger number of colors of light than the number of the receiving parts 12 arranged in the depth direction, to the inner wall surface 15. In this embodiment, the light source 20 is located in the upper half area in the vertical direction of the receiving part 12.

The light transmissive part 23 is a plate-like portion that transmits light. Further, the light transmissive part 23 is a plate-like member configured to scatter transmitted light. The light transmissive part 23 of this embodiment is a milky white plate-like member. The light transmissive part 23 is located to serve as a part of the side wall 17. Specifically, the side wall 17 has a notch to allow the inside and the outside of the side wall 17 to communicate with each other, and the light transmissive part 23 is a plate-like member fitted into the notch formed in the side wall 17.

The light transmissive part 23 includes a first surface 26 serving as a part of the side surface 17*a*, a second surface 27 continuous with the first surface 26 and serving as a part of the upper end surface surrounding the opening of the receiving part 12, and a light-source-opposed surface 28 opposed to the light source 20. The upper end surface is a surface provided at the upper end of the side boundary of the receiving area S2 and extending in a direction crossing the vertical direction. The first surface 26 is the opposite surface to the light-source-opposed surface 28. Further, the first surface 26 is a surface to be so called substantially flush with the inner surface of the side wall 17, and the second surface 27 is a surface to be so called substantially flush with the upper end surface of the receiving part 12. When the light-source-opposed surface 28 is irradiated with light emitted by the light source 20, the light transmissive part 23 allows transmitted light to be projected to the inner wall surface 15 through the first surface 26 and to be projected upward through the second surface 27. The light transmissive part 23 of this embodiment is configured to scatter the light irradiated to the light-source-opposed surface 28 to project part of the light upward through the second surface 27. In this embodiment, the second surface 27 and the identification mark 19 corresponding to one receiving part 12 are disposed adjacent to each other.

The insulating sheet part 22 is a sheet-like portion made of an insulator capable of transmitting light. The insulating sheet part 22 is a sheet-like portion disposed between the light transmissive part 23 and the light source 20. The insulating sheet part 22 of this embodiment is a transparent sheet. The insulating sheet part 22 of this embodiment provides insulation between the inside of the receiving area S2 and the light source 20. Since the light transmissive part 23 of this embodiment is fitted into the notch formed in the side wall 17, there can be a case where a gap is formed between the side wall 17 and the light transmissive part 23. In this embodiment, however, the insulating sheet disposed to provide insulation between the receiving area S2 and the light source 20 can suppress static electricity from being discharged from an object inside the receiving area S2 (e.g., the operator's hand) to the light source 20 through the gap between the side wall 17 and the light transmissive part 23. This configuration can suppress damage to the light source 20 by static electricity.

Figure 5:
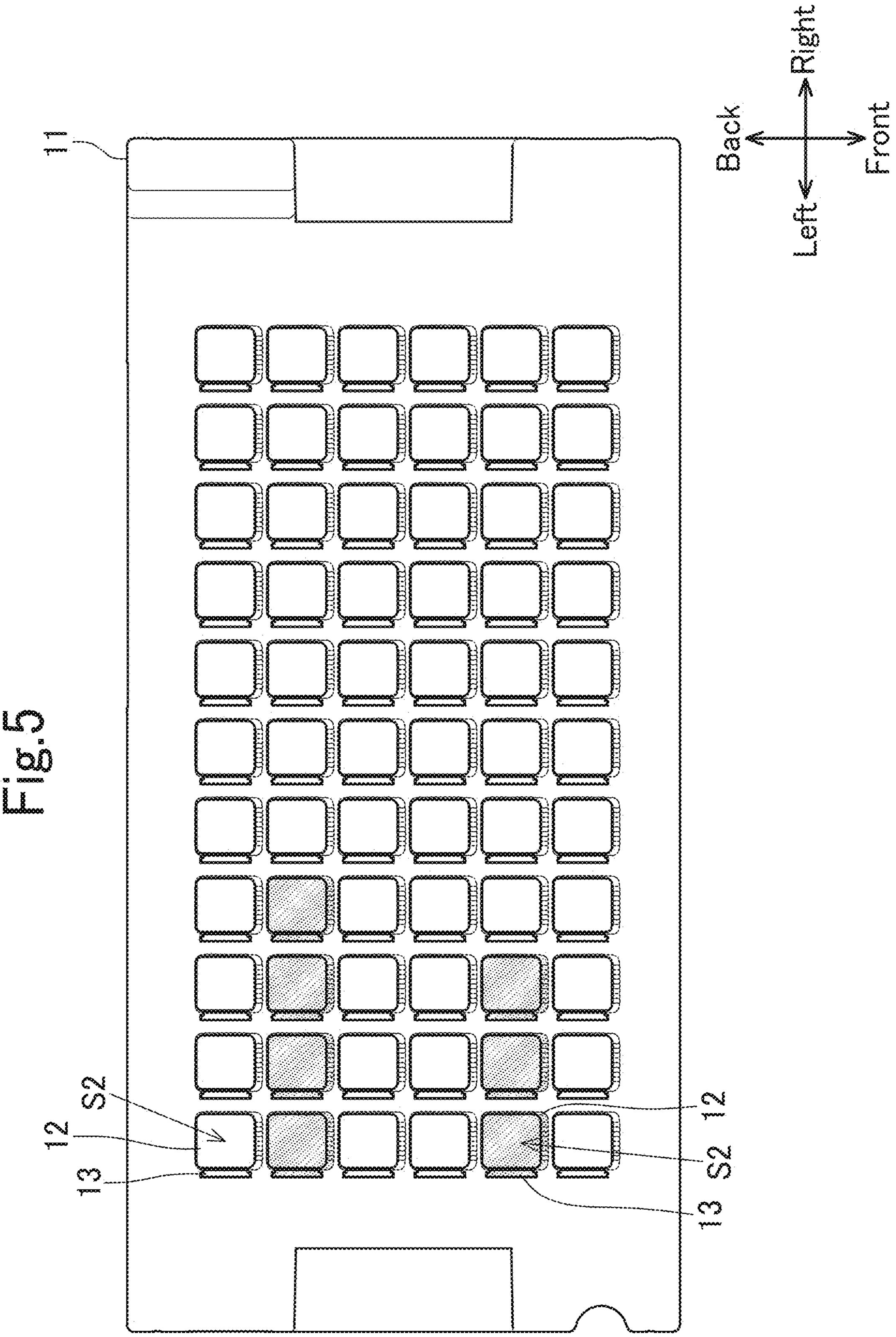
FIG. 5 is a view showing an operating state of a position indicator of the manual medicine distributing apparatus.

As shown in FIG. 4 and FIG. 5, the light projector 21 projects light upward through the inner wall surface 15 of the receiving part 12 and the upper end surface of the receiving part 12. Further, light emitted by the light source 20 is transmitted through the light transmissive part 23 and projected to the inner wall surface 15 through the first surface 26. Thus, the light projector 21 illuminates the receiving part 12 itself. The light projector 21 provided at a position close to the back side surface of the inner wall surface 15 reliably illuminates the back side surface. Since the inner wall surface 15 has the unevenness 18 (grooves) extending in the vertical direction, shadows extending in the vertical direction are formed on the back side surface when light is projected to the inner wall surface 15. The striped shadows thus formed on the inner wall surface 15 illuminated by the light projector 21 can facilitate placement of the medicine into the receiving part 12 with the illuminated inner wall surface 15. Further, light emitted by the light source 20 is transmitted through the light transmissive part 23 to be projected upward through the second surface 27.

As shown in FIG. 6, the destaticizer 14 is disposed inside the housing 5, and is configured to be capable of eliminating static electricity from the medicine in the receiving part 12. In this embodiment, the destaticizer 14 is disposed to focus on eliminating static electricity from the medicine in the receiving body 11 (each receiving part 12), rather than eliminating static electricity from the receiving body 11 itself. The destaticizer 14 generates ions I to eliminate static electricity from the medicine in the receiving part 12. That is, the destaticizer 14 is configured to be capable of contactlessly eliminating static electricity from the medicine in the receiving part 12. Specifically, the destaticizer 14 applies the ions I to a surface of the medicine to eliminate static electricity from the surface of the medicine. That is, the destaticizer 14 of this embodiment is a so-called ionizer. Further, the destaticizer 14 of this embodiment is configured to discharge electricity into air to thereby impart electric charges to, for example, molecules in the air and ionize the air. Specifically, the destaticizer 14 includes a rod-shaped base part 29, and a plurality of discharge parts 30 disposed to be separated from each other in a direction in which the base part 29 extends. In this embodiment, the base part 29 is disposed to have its extending direction coinciding with the long side direction of the receiving body 11 and to have its lower surface opposed to an upper surface of the receiving body 11. The discharge parts 30 are disposed below the base part 29. Further, the destaticizer 14 of this embodiment is configured as a windless ionizer capable of windlessly supplying the generated ions I to the medicine.

The base part 29 is a rod-shaped body disposed inside the housing 5 to extend substantially parallel to the upper surface of the receiving body 11. The base part 29 is a rod-shaped body extending in a linear direction substantially parallel to the long side direction of the receiving body 11. That is, the base part 29 is disposed to allow the discharge parts 30 disposed on the base part 29 to share the same distance to the upper surface of the receiving body 11. The base part 29 of this embodiment is fixed inside the housing 5. The base part 29 of this embodiment is disposed to enable static electricity elimination from the medicine inside all receiving parts 12 when the receiving body 11 moves from the projecting position P2 to the housed position P1. Specifically, the base part 29 has a length larger than the length in a long side direction (right-left direction) of an area of the receiving body 11 in which the receiving parts 12 are provided, and is disposed at a position at which the ions I can be supplied to the medicine inside all receiving parts 12 arranged in the short side direction of the receiving body 11 when the receiving body 11 moves from the projecting position P2 to the housed position P1. In this embodiment, the destaticizer 14 (base part 29) is located above the front side of the receiving parts 12 of the receiving body 11 at the housed position P1. This configuration enables static electricity elimination from the medicine in all receiving parts 12.

Each of the discharge parts 30 is a portion capable of discharging electricity into air by high voltage application. The discharge part 30 of this embodiment has a needle-like terminal thereinside, and is configured to discharge electricity from the terminal into the air by applying a high voltage to the terminal. The discharge part 30 of this embodiment is configured to allow the voltage applied to the terminal to be switchable between a positive voltage and a negative voltage within a certain period. In this embodiment, the period within which the positive voltage and the negative voltage applied to the terminal discharge part 30 are switched is set to be shorter than the duration of time required for one receiving part 12 to pass below the destaticizer 14 when the receiving body 11 moves from the projecting position P2 to the housed position P1. That is, the discharge part 30 is configured to generate both positive and negative ions I while the one receiving part 12 passes below the destaticizer 14 when the receiving body 11 moves from the projecting position P2 to the housed position P1. The discharge part 30 of this embodiment applies a pulsed current to the terminal. That is, the destaticizer 14 of this embodiment is configured as a pulse alternating current ionizer.

The input part 6 is a portion to which information on the medicine to be packaged can be input. Specifically, information for determining which medicine should be placed in each receiving part 12 can be input to the input part 6. In this embodiment, prescription information is input to the input part 6. The prescription information includes information on which medicine should be packaged in each package. The input part 6 is formed of, for example, a touch panel. The touch panel can also be configured to allow information to be input through communication with an external terminal (such as a controller).

In this embodiment, information for operating the manual medicine distributing apparatus 3 can be input to the input part 6: specifically, after the medicine to be placed is placed into the receiving parts 12, information indicating that the placement is completed can be input to the input part 6.

The controller part controls the entire medicine packaging apparatus 1. The controller part controls the entire medicine packaging apparatus 1 based on the information input to the input part 6. Specifically, the controller part controls the automatic feeding apparatus 2 based on the prescription information input to the input part 6 to feed the medicine to be packaged to the packaging part 4. When, for example, the medicine to be packaged is not stored in the automatic feeding apparatus 2, the controller part controls the manual medicine distributing apparatus 3, determining that the medicine needs to be manually distributed.

Next, a description will be given on an operation of the manual medicine distributing apparatus 3.

When the medicine needs to be manually distributed, the controller part moves the receiving body 11 to the projecting position P2. In this embodiment, the controller part determines whether or not manual distribution is required based on the prescription information input to the input part 6, and when it determines that manual distribution is required, the controller part moves the receiving body 11 to the projecting position P2.

The controller part then determines which receiving part 12 the manually distributed medicine should be placed into, based on the prescription information. Specifically, the controller part determines that the receiving part 12 corresponding to the package in which the manually distributed medicine should be packaged is the receiving part 12 into which the manually distributed medicine should be placed.

When the receiving part 12 into which the medicine should be placed by manual distribution is determined, the controller part controls the position indicator 13 to allow the light projector 21 to project light to the inner wall surface 15 of the receiving part 12 into which the medicine should be placed. In this embodiment, the position indicator 13 projects light only to the inner wall surface 15 of the receiving part 12 into which the medicine should be placed. The light projector 21 of this embodiment projects colored light to the inner wall surface 15 of the receiving part 12 into which the medicine should be placed. Then, the operator places the medicine into the receiving part 12 indicated by the position indicator 13.

When placing the medicine into the receiving part 12, the operator can place the medicine packaged in a PTP sheet directly into the receiving part 12, or can first transfer the medicine from the PTP sheet to another container and then place the medicine contained in the other container into the receiving part 12. There are some cases where the medicine to be placed into the receiving part 12 is electrically charged due to friction with the PTP sheet or friction with other medicine within the container.

When a plurality of kinds of medicine need to be manually distributed, a first kind of medicine is first placed, and upon completion of the placement, information indicating that the placement of the first kind of medicine is completed is input to the input part 6. When receiving the information indicating that the placement of the first kind of medicine is completed, the controller part controls the position indicator 13 to allow the light projector 21 to project light to the receiving part 12 into which a second kind of medicine should be placed. The above control is repeatedly carried out until all kinds of medicine to be manually distributed into the receiving parts 12 are completely placed.

When all the medicine to be manually distributed are completely placed, the operator checks whether appropriate medicine is in the appropriate receiving parts 12. When the operator checks the medicine placed in the receiving parts 12, the light projectors 21 each project white light to a corresponding one of the receiving parts 12 in which one or more kinds of medicine should be placed. In this embodiment, when all kinds of medicine to be manually distributed are completely placed into the receiving parts 12, the controller part controls each of the position indicators 13 to allow each of the receiving parts 12 in which one or more kinds of medicine should be placed to be illuminated with white light by each corresponding one of the light projectors 21.

When the operator's checking is completed, the receiving body 11 moves from the projecting position P2 to the housed position P1. In this embodiment, when the information indicating that the checking operation is completed is input to the input part 6, the controller part controls to move the receiving body 11 from the projecting position P2 to the housed position P1.

The destaticizer 14 operates when the receiving body 11 moves from the projecting position P2 to the housed position P1 to eliminate static electricity from the medicine in the receiving parts 12. In this embodiment, the destaticizer 14 starts operating together with the start of the movement of the receiving body 11. In more details, the destaticizer 14 starts operating when the instruction is input to, for example, the input part 6 for moving the receiving body 11. Specifically, the destaticizer 14 applies voltage to the discharge parts 30 to generate the ions I when the receiving body 11 moves from the projecting position P2 to the housed position P1. The destaticizer 14 is also configured to generate the ions I at least when the receiving parts 12 pass below the destaticizer 14. Further, the destaticizer 14 stops operation when the receiving body 11 reaches the housed position P1. That is, the destaticizer 14 operates only while the receiving body 11 moves from the projecting position P2 to the housed position P1.

When moving from the projecting position P2 to the housed position P1, the receiving body 11 moves to have a substantially constant distance between the lower surface of the destaticizer 14 and the upper end surfaces of the receiving parts 12. In this embodiment, the destaticizer 14 has the lower surface extending in the horizontal direction, and the receiving body 11 has the upper surface extending horizontally and moves in the horizontal direction when moving; thus, the receiving body 11 moves from the projecting position P2 to the housed position P1 to have a substantially constant distance between the lower surface of the destaticizer 14 and the upper end surfaces of the receiving parts 12.

When moved to the housed position P1, the receiving body 11 sequentially feeds the medicine in the receiving parts 12 to the packaging part 4. Specifically, the receiving body 11 is controlled by the controller part to open the bottom parts 16 of the receiving body 11. The medicine in each of the receiving parts 12 of which the bottom part 16 is opened falls and is fed to the packaging part 4 through the medicine feeding passage.

According to the manual medicine distributing apparatus configured as above, the light projector 21 projects light to the inner wall surface 15 of the receiving part 12; thus, the inner wall surface 15 of the receiving part 12 is illuminated by the light from the light projector 21. This configuration illuminates the receiving part 12 itself (i.e., a recess itself) with light, and thus enables the operator to more easily identify the position at which the medicine should be placed than the configuration that a periphery of the receiving part 12 is illuminated.

The configuration can also be such that at least one position indicator 13 includes a plurality of position indicators 13, each receiving part 12 includes a side wall 17 defining a side boundary of the receiving area S2, and the light projector 21 of each of the plurality of position indicators 13 is disposed inside the side wall 17 of each receiving part 12. Such a configuration that the light projector 21 is disposed inside the side wall 17 can suppress the light projector 21 from blocking the medicine being placed into the receiving area, and the configuration that the light projector 21 emits light to illuminate the inner wall surface 15 from the inside of the receiving part 12 can reliably project light to the inner wall surface 15.

The configuration can also be such that the light projector 21 of each of the plurality of position indicators 13 includes the light source 20, and the light transmissive part 23 that transmits light emitted by the light source 20; the inner wall surface 15 includes the side surface 17*a* being the inner surface of the side wall 17, and the bottom surface 16*a* that defines a lower boundary of the receiving area S2; the light transmissive part 23 includes a first surface 26 serving as a part of the side surface 17*a*; the light source 20 is disposed on an opposite side to the first surface 26 of the light transmissive part 23; and the light source 20 is configured to emit light to illuminate the inner wall surface 15 through the first surface 26. Such a configuration that the light source 20 is disposed on the opposite side to the first surface 26 of the light transmissive part 23 can suppress the light source 20 from being damaged by, for example, the medicine to be placed.

The configuration can further be such that: the light transmissive part 23 includes the second surface 27 continuous with the first surface 26 and serving as a part of the upper end surface located at the upper end of the side boundary; and the light source 20 emits light that passes through the light transmissive part 23 to also illuminate an upper portion of the receiving part 12 through the second surface 27. Such a configuration that the light source 20 emits light to also illuminate the upper portion of the receiving part 12 enables the operator to further easily identify the position at which the medicine should be placed.

Further, the configuration can be such that the inner wall surface 15 of the receiving part 12 has unevenness. Such a configuration allows the unevenness to form an illuminated portion and a shadow portion on the inner wall surface 15 when light is projected to the inner wall surface 15, and thus enables the operator to easily identify that light is projected to the inner wall surface 15. Thus, the operator can easily identify the position at which the medicine should be placed.

The light transmissive part 23 configured to scatter the light emitted by the light source 20 entirely illuminates the inner wall surface 15 with the scattered light emitted by the light source 20. This configuration enables the operator to easily identify the receiving part 12 into which the medicine should be placed. Moreover, the configuration that the light emitted by the light source 20 is scattered allows the operator to feel less glaring than the configuration that the light transmissive part 23 is made to be transparent.

Further, the configuration that the light source 20 is disposed in the upper half area in the vertical direction of the receiving part 12 can suppress the medicine from blocking light after the medicine is placed in the receiving part 12. The configuration that the first surface 26 is disposed on an upper part of the side surface 17*a* allows the first surface 26 to be hardly hidden by the medicine in the receiving part 12, and thus light can be reliably projected to the inner wall surface 15.

The configuration that the identification mark 19 is disposed for identifying each corresponding receiving part 12 on the upper end surface of receiving part 12 and that the second surface 27 is disposed adjacent to the identification mark 19 makes identifiable the receiving part 12 into which the medicine should be placed, using both the identification mark 19 and light.

In addition, the configuration that the identification mark 19 and the second surface 27 that correspond to each receiving part 12 are disposed adjacent to each other enables the operator to intuitively recognize the identification mark 19 indicating the receiving part 12 into which the medicine should be placed.

The configuration that the first surface 26 is disposed to be substantially flush with the inner surface of the side wall 17 hardly causes the light transmissive part 23 to block the medicine from being placed into the receiving part 12, and can suppress the receiving capacity of the receiving area S2 from decreasing.

Further, since a specific number of the receiving parts 12 are arranged in a front-back direction of the receiving body 11 and the light projectors 21 are each configured to be capable of projecting white light and colored light in different colors respectively corresponding to at least the specific number of the receiving parts 12 arranged in the front-back direction, colored light in different colors can be projected to at least the respective receiving parts 12 arranged in the front-back direction, thereby enabling the receiving parts 12 arranged in the front-back direction to be differently indicated from each other. Moreover, the configuration that, for example, white light can be projected to the receiving part 12 after the medicine is placed in the receiving part 12 allows the operator to easily recognize the color of the medicine when confirming that the appropriate medicine has been placed in the receiving part 12.

The configuration that static electricity can be eliminated by the destaticizer 14 from the medicine in the receiving part 12 can suppress the medicine from being stuck inside a device (e.g., packaging part 4) or from failing to appropriately moving in a passage formed inside the device (e.g., medicine feeding passage). This can suppress a failure from occurring in the device to which the medicine is to be fed.

Further, the configuration that the destaticizer 14 can eliminate static electricity contactlessly from the medicine in the receiving part 12 can suppress contamination with foreign objects resulting from the attachment of the medicine or the like to the destaticizer 14.

The destaticizer 14 includes the plurality of discharge parts 30 for generating the ions I by electrical discharging, and each of the plurality of discharge parts 30 is configured to alternately generate positive ions I and negative ions I, and configured generate both the positive ions I and the negative ions I while one receiving part 12 passes below the destaticizer 14. This configuration enables static electricity to be reliably eliminated from the medicine in the receiving part 12 even when the medicine is positively charged or negatively charged.

Further, the destaticizer 14 configured as a windless ionizer can suppress the medicine in the receiving part 12 from being blown by wind while eliminating static electricity from the medicine.

The receiving part 12 has the bottom part 16 electrically grounded, and the destaticizer 14 is configured to apply the ions I from above the receiving part 12 to the surface of the medicine in the receiving part 12. Thus, static electricity can be eliminated by the ions I for portions of the surface of the medicine not in contact with the bottom surface 16*a* while static electricity is eliminated by grounding through the bottom surface 16*a* for portions in contact with the bottom surface 16*a*. This allows static electricity to be reliably eliminated from the medicine.

Hereinbefore, one embodiment of the present invention has been described by way of an example. However, the present invention is not limited to this embodiment, and various modifications can be made without departing from the gist of the present invention.

The manual medicine distributing apparatus 3 has been described by taking, for example, the case of being configured as part of the medicine packaging apparatus 1 capable of packaging tablets, without limitation thereto. For example, the manual medicine distributing apparatus 3 can be configured integrally with the medicine packaging apparatus 1 capable of packaging both tablets and powder, or can be configured as a medicine dispensing machine for feeding medicine to a device other than the medicine packaging apparatus 1.

The position indicator 13 has been described by taking, for example, the case where the plurality of position indicators 13 are provided, without limitation thereto. The configuration can also be such that only one position indicator 13 is provided. When employing such a configuration, for example, the configuration can also be such that the light projector 21 as the position indicator 13 is provided above the receiving body 11 to project light from above to the inner wall surface 15 of each receiving part 12. Even when the plurality of position indicators 13 are provided, the configuration can be, without limiting to the case where the light projectors 21 are disposed inside the receiving body 11, such that the plurality of light projectors 21 are disposed above the receiving body 11 to project light from above to the respective inner wall surfaces 15.

Further, the light projector 21 has been described by taking, for example, the case of being configured to project light in single color to illuminate the inner wall surface 15, without limitation thereto. For example, the configuration can also be such that the light projector 21 indicates a symbol such as a numerical figure or a letter, or illuminates the inner wall surface 15 by blinking light or by changing the colors of light in short cycles.

The light projector 21 has been described by taking, for example, the case of projecting light to the receiving part 12 into which the medicine should be placed, without limitation thereto. For example, the light projector 21 can be configured to project light only to the receiving part 12 into which the medicine should not be placed. The configuration can also be such that those receiving parts 12 into which the medicine should be placed and those receiving parts 12 into which the medicine should not be placed are illuminated with different colors, for example, blue for the former and red for the latter to allow the operator to identify those receiving parts 12 into which the medicine should be placed. In addition, the light projector 21 can be configured to change the color of projecting light depending on the color of the surface of the medicine to be placed. The light projector 21 can further be configured to change the color of projecting light according to the timing of taking medication (e.g., morning, noon, evening) based on the prescription information that has been input.

Further, the light transmissive part 23 has been described by taking, for example, the case of being milky white in color, without limitation thereto, and can employ various configurations capable of scattering light emitted by the light source 20. The light transmissive part 23 can also be configured not to scatter light emitted by the light source 20, such as being configured to be colorless and transparent.

The description has been given on the case where the light transmissive part 23 and the receiving body 11 are provided separately from each other, without limitation thereto. The function to pass and scatter light can be imparted to the receiving body 11 itself.

Further, the unevenness 18 has been described by taking, for example, the case of being the grooves extending in the vertical direction, without limitation thereto, and can be configured in various shapes. For example, when the unevenness 18 is formed to have an arrow shape, an arrow-shaped shadow can be casted by projecting light to prompt the operator to place the medicine.

The destaticizer 14 has been described by taking, for example, the case of being configured to repeatedly apply voltage to each discharge part 30 while changing its polarity to thereby generate the positive ions I and the negative ions I, without limitation thereto. For example, the configuration can be such that each discharge part 30 generates only one of the positive ions I and the negative ions I, or eliminates static electricity from the medicine by bringing a self-discharging brush into contact with the medicine.

Further, the destaticizer 14 has been described by taking, for example, the case of being fixed to the housing 5 and configured to generate the ions I while the receiving body 11 moves, without limitation thereto. The configuration can be such that the destaticizer 14 generates the ions I while moving to eliminate static electricity from the medicine in each receiving part 12.

The receiving body 11 has been described by taking, for example, the case of moving only in the horizontal direction, without limitation thereto. The configuration can be such that the receiving body 11 can move in the horizontal direction and the vertical direction. For example, the configuration can be such that the receiving body 11 at the projecting position P2 changes its height. Further, the configuration can be such that the receiving body 11 can move to allow an outlet of the ions I (i.e., discharge part 30) to enter the internal space of each receiving part 12.

Further, the destaticizer 14 has been described by taking, for example, the case of being in operation in synchronization with the receiving body 11 moving from the projecting position P2 to the housed position P1, without limitation thereto. For example, the destaticizer 14 can be configured to operate after the receiving body 11 reaches the housed position P1 from the projecting position P2, or can be configured to operate only during a certain duration for which the receiving body 11 moves from the projecting position P2 to the housed position P1.

The destaticizer 14 has been described by taking, for example, the case of being disposed above the receiving body 11, without limitation thereto. The destaticizer 14 can be disposed on a side of the receiving body 11, or can be, for example, disposed inside the receiving body 11 to supply the ions I within the receiving areas S2 through the side walls 17 of the respective receiving parts 12. Further, the configuration can be such that the destaticizer 14 has a plate shape to cover all the receiving parts 12, or includes a comb-like ion outlet.

REFERENCE SIGNS LIST

1: Medicine packaging apparatus
2: Automatic feeding apparatus
3: Manual medicine distributing apparatus
4: Packaging part
5: Housing
6: Input part
11: Receiving body
12: Receiving part
13: Position indicator
14: Destaticizer
15: Inner wall surface
16: Bottom part
16*a*: Bottom surface
17: Side wall
17*a*: Side surface
18: Unevenness
19: Identification mark
20: Light source
21: Light projector
22: Insulating sheet part
23: Light transmissive part
24: Light emitter body
25: Base plate
26: First surface
27: Second surface
28: Light-source-opposed surface
29: Base part
30: Discharge part
S1: Housing space
S2: Receiving area
P1: Housed position
P2: Projecting position
I: Ions

The invention claimed is:

1. A manual medicine distributing apparatus comprising
a receiving body comprising a plurality of receiving parts each having a receiving area in which medicine can be received,
each of the plurality of receiving parts being open upward and configured to allow an operator to manually place the medicine thereinto from above,
the manual medicine distributing apparatus comprising at least one position indicator configured to indicate a receiving part of the plurality of receiving parts into which the medicine should be placed, wherein each of the plurality of receiving parts comprises a side wall that defines a side of the receiving area in which medicine is to be placed, the at least one position indicator comprises a light projector disposed inside the side wall of each of the plurality of receiving parts, the light projector is configured to illuminate an inner surface of the side wall other than a surface in which the light projector is disposed, the light projector comprises a light source, and a light transmissive part that transmits light emitted by the light source, the light transmissive part comprises: a first surface serving as a part of the inner surface of the side wall; and a second surface serving as a part of an upper end surface surrounding the receiving area, the light source is disposed on an opposite side to the first surface of the light transmissive part, the light source is configured to emit light that passes through the light transmissive part to project light through the first surface and also illuminate an upper portion of each of the plurality of receiving parts through the second surface, the upper end surface is provided with an identification mark for identifying each corresponding one of the plurality of receiving parts, and the second surface and the identification mark, which are corresponding to each of the plurality of receiving parts, are disposed adjacent to each other.

2. The manual medicine distributing apparatus according to claim 1, wherein the identification mark is a numerical figure showing each of the plurality of receiving parts.

3. The manual medicine distributing apparatus according to claim 1, wherein the second surface is continuous with the first surface.

4. The manual medicine distributing apparatus according to claim 1, wherein the inner surface of the side wall other than the surface in which the light projector is disposed has unevenness.

* * * * *